May 14, 1935.  W. F. FOLMER ET AL  2,001,414
INSECT EXTERMINATOR
Filed May 9, 1933  2 Sheets-Sheet 1
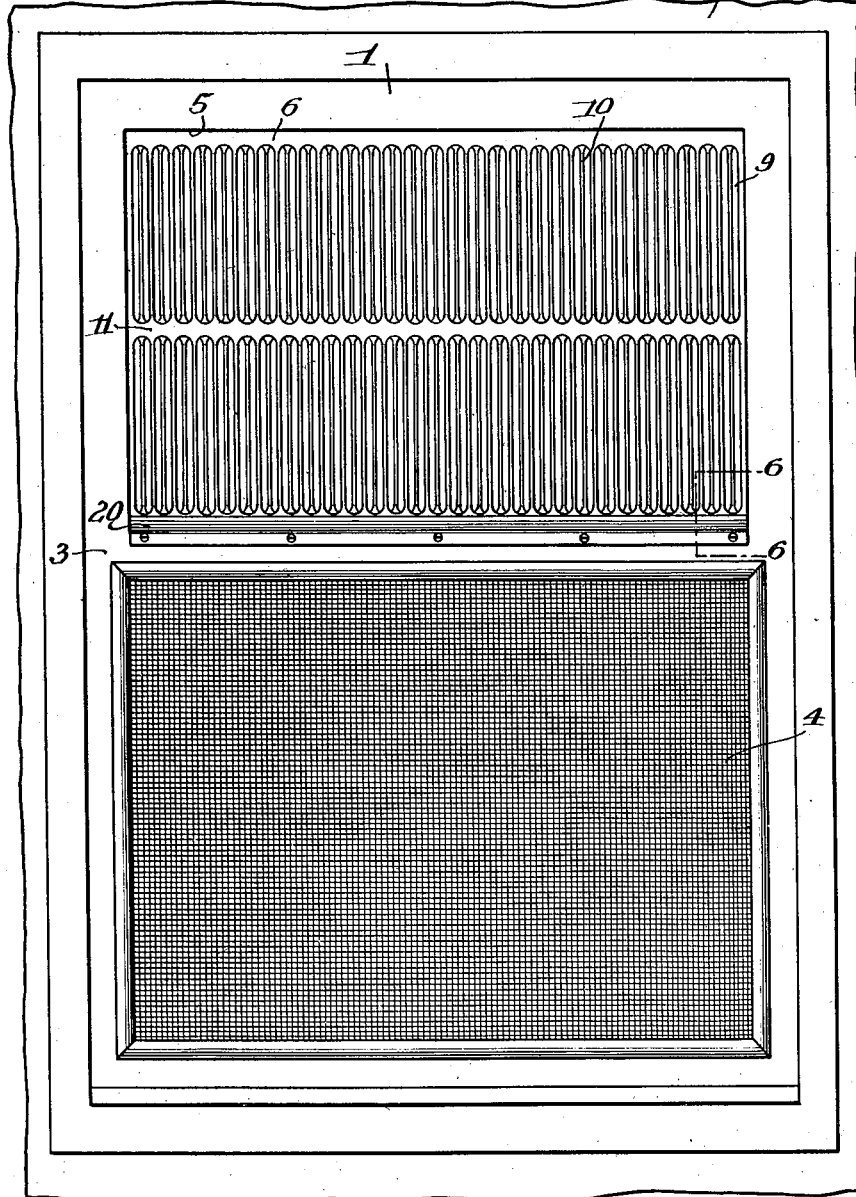
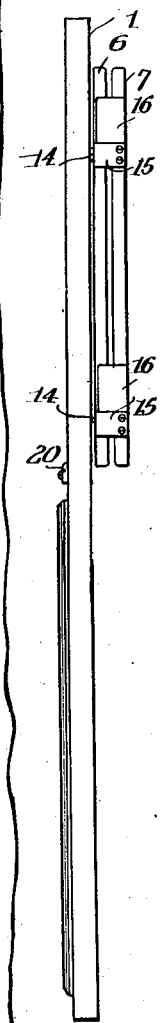
INVENTORS
William F. Folmer
Harrison L. Chapin
BY
their ATTORNEY

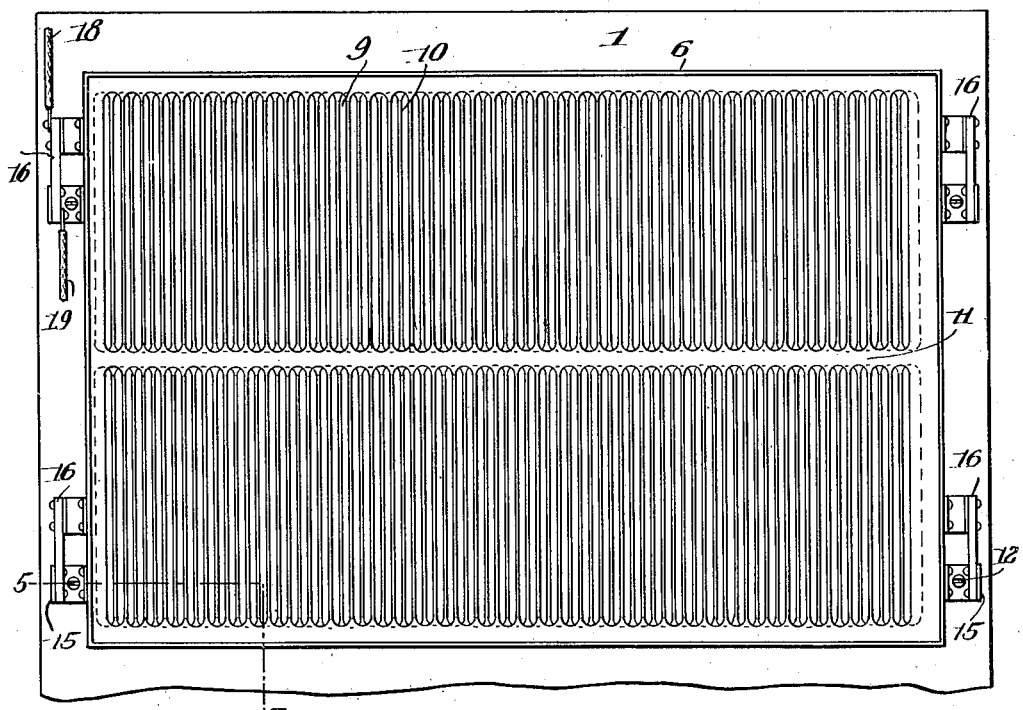
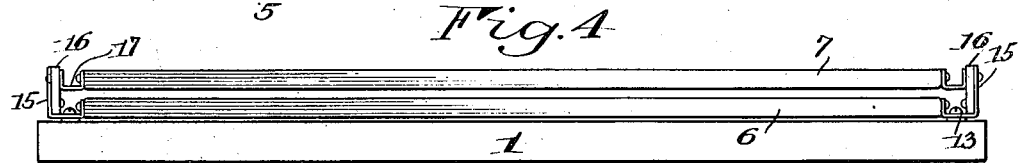
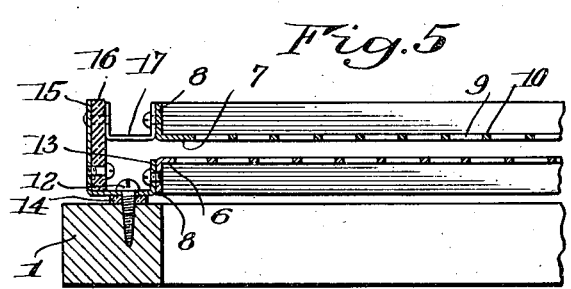
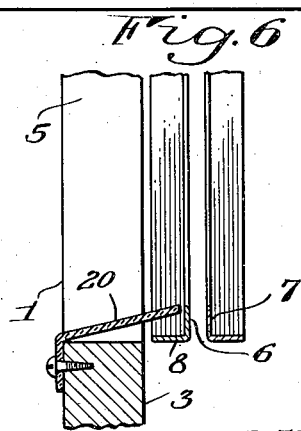

Patented May 14, 1935

2,001,414

UNITED STATES PATENT OFFICE 2,001,414

INSECT EXTERMINATOR

William F. Folmer and Harrison L. Chapin, Rochester, N. Y., assignors to Folmer-Chapin Corporation, Rochester, N. Y., a corporation of New York Application May 9, 1933, Serial No. 670,140

4 Claims. (Cl. 43—112)

Our present invention relates to insect exterminators and more particularly to high tension electrically charged screens whereby openings, such as doors and windows, the fronts of food safes and similar areas ordinarily protected against insects through the use of ordinary fly screens or mosquito netting may be so protected against their passage by the use of a device that will also destroy them by means of an electric current while at the same time interfering in no way with the ventilation afforded by screens and nettings. The improvements are directed in part toward providing a barrier of this nature that will be light, simple in construction and application and will use a high tension current for electrocuting the insects with a minimum of danger to humans and animals. To these and other ends, the invention resides in certain improvements and combinations of parts, all as will be hereinafter more fully described, the novel features being pointed out in the claims at the end of this specification.

In the drawings:

Fig. 1 is a front or outside elevation of a window fitted with an insect destroying screen constructed in accordance with and illustrating one embodiment of our invention;

Fig. 2 is a side elevation thereof on a reduced scale;

Fig. 3 is an inside elevation of the electrically charged portion of the combination screen of the present embodiment, the lower portion of the screen frame being broken away;

Fig. 4 is a top view;

Fig. 5 is an enlarged fragmentary horizontal section taken substantially on the line 5—5 of Fig. 3, and Fig. 6 is an enlarged fragmentary vertical section taken substantially on the line 6—6 of Fig. 1.

Similar reference numerals throughout the several views indicate the same parts.

Our invention, in its broader aspects, may be erected and applied to a window, for instance, as shown, as a more or less permanent fixture or removably fitted thereto. In the present case, we have shown it as part of a removable and replaceable combination frame 1 fitted in the usual manner to a window casing 2 and constituting what we will call the base frame. This embodiment has been designed for the particular purpose of screening cow barns and the like to repel and kill the swarms of flies which find such places so attractive. To this end, the lower portion of the base frame 1 below the cross rail 3 is taken up with an ordinary wire fly screen 4 to freely admit light and air and also to permit a view to be had through the window. Opposite the upper half opening 5 and offset on the inner side thereof are two parallel frames 6 and 7, the former of which substantially closes the opening but is actually spaced from the base frame all the way around.

Each frame is preferably in the form of a stamped metal plate having flanged edges 8 to strengthen it. The body and major expanse thereof is perforated with two rows of long narrow slots 9 forming between them two series of wires 10. A solid strip 11 left between the rows of slots provides a stiffening cross bar at the center. The screens are so assembled that the wires 10 of one are staggered with relation to the corresponding wires of the other, as clearly shown in Fig. 5, and the width of the slots 9 is such and the spacing between the screen frames is such that a fly or other insect attempting to pass through the screens will inevitably come in contact with wires of both screens or the electrified zones thereof, the two screens being heavily electrically charged, one positive and the other negative, as will presently appear. In fact, such a high tension current may be used, say, thirty-five hundred to four thousand volts, that there is little chance of an insect lighting on the outer wires without attracting a short circuiting arc through its body and being consumed. On the other hand, a person or animal may touch or brush against either screen without any electrical effect, as each set of wires presents a uniform plane of contact and they are always closer to each other than any portion of the anatomy could ordinarily obtrude.

The frame 6, which is the outer one with reference to the facing of the window but the one next adjacent to the body frame 1, is secured to the latter by screws 12 extending through four angle brackets 13 fastened to the flanges of the screen frame with an intervening insulating washer 14 that establishes the proper spacing, which is great enough for insulating purposes but not sufficient to allow a fly to crawl between. Incidentally, the base frame 1 is preferably made of wood or similarly electrically inert material. On each bracket 13 is an inwardly turned extension 15 carrying a block 16 of heavy insulating material, such as mica. To the opposite side of this mica block, in each instance, is secured an angle bracket 17 that is also secured to the flange of the other or inner frame 7 by which it is supported from the sides in proper spaced relationship. One of the wires 18 of the high tension circuit is bound to the portion 15 of one of the brackets 13 of plate 6, while the other wire 19 is bound to one of the brackets 17 of plate 7 to oppositely charge the screens, all as shown in Fig. 3.

One of the advantages of these lateral supports is that an insulating medium between the screens can be provided that is much thicker than the spacing of the screens themselves, giving adequate protection against arcing and burning. We discovered experimentally that it was practically impossible to directly connect the screen plates or frames, spacing them the desired short distance apart, and to find an insulating material that was adequate in a corresponding thickness. Another advantage is that this construction leaves an absolutely free space between the screens, as appears from Fig. 4, so that the dead insects fall through, there being no projecting or intervening parts upon which the debris of their bodies can lodge.

Some of the bodies fall between the screens inevitably, but most of them drop down the outer face of the outer screen 6 within the opening 5 of the base frame 3. It being desirable that as much of the accumulation as possible should be discharged outside of the window, we secure to the rail 3 a sloping plate 20 that extends into the opening 5 and between the flanges 8 of screen frame 6 close to the screen to act as a shed for this purpose.

As first stated and as is obvious, an electric screen constructed in accordance with our invention may be used at almost any opening to which insects are attracted and stables particularly can be equipped with screens at a nominal cost and with the greatest safety. The screens are rigid, though allowing ventilation, and retain their accurate spacing even when subjected to minor blows.

We claim as our invention:

1. In an electrified insect exterminator, the combination with a base frame, of a pair of spaced frames together constituting a unit offset therefrom and embodying screens composed of positive and negative high tension wires, high tension electric connections to the respective screens, and insulated supports connecting the screen frames to each other and one of them to the base frame, the spacing of the frames being maintained at the bottom to allow insect bodies to fall clear of the base frame.

2. In an electrified insect exterminator, the combination with an insulated support, of a pair of plates carried thereby and one by the other as an offset unit and slightly spaced in parallel relationship, said plates being provided with oppositely turned marginal flanges and being provided further with slotted openings in their central areas forming each into a series of parallel wires, the spacing of the frames being maintained at the bottom to allow insect bodies to fall clear between them, and high tension positive and negative circuit connections to the respective plates.

3. In an electrified insect exterminator, the combination with a base frame, of a pair of frames offset therefrom in parallel spaced relationship affording a clear opening at the bottom between them through which insect bodies may fall clear of the base frame, said frames embodying screens composed of positive and negative high tension wires, brackets on the sides of the frames connecting them with the base frame and with each other and embodying interposed insulating blocks only one of the brackets being connected to the base frame, all constituting an organized unit assembled upon the base frame and high tension electrical connections for the screens.

4. In an electrified insect exterminator, the combination with a base frame, of a pair of parallel frames offset from the opening therein on the inner side and embodying slightly spaced screens affording a clear opening at the bottom between them through which insect bodies may fall clear of the base frame, said frames being composed, respectively, of positive and negative high tension wires, an inclined shed at the bottom of the base frame opening leading from the inner screen face but out of contact therewith to the opposite side of the base frame, high tension electric connections to the respective screens, and insulated supports connecting the screen frames and the base frame.

WILLIAM F. FOLMER.
HARRISON L. CHAPIN.